United States Patent
Becker-Szendy et al.

(10) Patent No.: US 9,582,363 B2
(45) Date of Patent: Feb. 28, 2017

(54) FAILURE DOMAIN BASED STORAGE SYSTEM DATA STRIPE LAYOUT

(71) Applicant: INTERNATIONAL BUSINESS MACHINES CORPORATION, Armonk, NY (US)

(72) Inventors: Ralph A. Becker-Szendy, Los Gatos, CA (US); David J. Craft, Wimberly, TX (US); Scott D. Guthridge, San Jose, CA (US); James C. Wyllie, Monte Sereno, CA (US)

(73) Assignee: International Business Machines Corporation, Armonk, NY (US)

( * ) Notice: Subject to any disclaimer, the term of this patent is extended or adjusted under 35 U.S.C. 154(b) by 298 days.

(21) Appl. No.: 14/299,941

(22) Filed: Jun. 9, 2014

(65) Prior Publication Data

US 2015/0355971 A1    Dec. 10, 2015

(51) Int. Cl.
*G06F 11/00* (2006.01)
*G06F 11/10* (2006.01)

(52) U.S. Cl.
CPC .................. *G06F 11/1096* (2013.01)

(58) Field of Classification Search
CPC ..... G06F 2211/10–2211/1095; G06F 11/1096; G06F 11/1662
See application file for complete search history.

(56) References Cited

U.S. PATENT DOCUMENTS

| | | | |
|---|---|---|---|
| 5,822,782 A | 10/1998 | Humlicek et al. | |
| 6,366,965 B1 | 4/2002 | Binford et al. | |
| 7,502,669 B1 | 3/2009 | Evans et al. | |
| 8,260,974 B1 | 9/2012 | Fredette et al. | |
| 2003/0079156 A1 | 4/2003 | Sicola et al. | |
| 2003/0093586 A1 | 5/2003 | Sumiyoshi et al. | |
| 2004/0103246 A1* | 5/2004 | Chatterjee ............ | G06F 11/004 711/114 |
| 2011/0145818 A1 | 6/2011 | Vemuri et al. | |
| 2012/0317357 A1 | 12/2012 | Kopylovitz et al. | |
| 2013/0024730 A1 | 1/2013 | Kobayashi et al. | |
| 2014/0075240 A1 | 3/2014 | Maeda et al. | |

(Continued)

FOREIGN PATENT DOCUMENTS

JP    2003150319    5/2003

OTHER PUBLICATIONS

Srimugunthan et al., "Distributed Wear levelling of Flash Memories", Computer Science and Automaton Department, Indian Institute of Science,Bangalore, India, Feb. 25, 2013.

(Continued)

*Primary Examiner* — Jason Bryan
(74) *Attorney, Agent, or Firm* — Antony P. Ng; Randall J. Bluestone

(57) ABSTRACT

A method for performing stripe placement within a storage system is disclosed. After a set of failure domains within a storage system has been identified, the failure domains are then organized to form a hierarchy of failure domains. A failure domain is defined as a group of one or more disks that are more likely to fail together because a common component is shared by that group of disks. Stripe placement is performed across all active failure domains within the storage system using a greedy algorithm.

6 Claims, 8 Drawing Sheets

(56) References Cited

U.S. PATENT DOCUMENTS

2015/0067245 A1* 3/2015 Kruger ................ G06F 3/0634
　　　　　　　　　　　　　　　　　　　711/103

OTHER PUBLICATIONS

Rosenfeld et al., "Using Disk Add-Ons to Withstand Simultaneous Disk Failures with Fewer Replicas", Technion—Israel Institute of Technology, pp. 1-7 (Downloaded Jun. 9, 2014) URL: http://www.cs.technion.ac.il/people/namit/online-publications/rosenfeld13.pdf.

* cited by examiner

FAILURE DOMAIN BASED STORAGE SYSTEM DATA STRIPE LAYOUT

BACKGROUND OF THE INVENTION

1. Technical Field

The present disclosure relates to redundant array of independent storage device systems in general, and in particular to a flexible method for distributing data and redundancy information across the storage devices to improve the reliability and availability of the system when a pre-defined group of storage devices fail together.

2. Description of Related Art

Redundant Array of Independent Disk (RAID) is a data storage virtualization technology that configures and manages multiple storage devices to improve the reliability, availability, and performance of storing and retrieving data in a storage system. RAID storage systems employ error-control coding techniques appropriate to the reliability of the underlying storage devices and hardware subsystems that control and package the storage devices, such as enclosures, drawers, blades and power subsystems. Example error detection and correction techniques include n-fault-tolerant Reed-Solomon erasure codes and (n+1)-way replication, both of which can correct n faults or erasures in stored data.

Historically, RAID systems have used fixed algorithmic techniques to place data and error correction redundancy information and to reserve spare space (for reconstructing data after faults) on storage devices. Regardless of the RAID level being employed, individual strips constituting the whole of a data stripe are typically spread across different independent disk drives. With data stripes being distributed, the subsequent loss of one or more strips, up to the maximum recoverability of the redundancy, will still allow the whole of the data strip to be reconstructed from the other strips that are present on non-failed disk drives. For example, in a RAID 5 redundancy encoding where a parity strip is lost due to a failed disk drive, the whole of the data strip may be reconstructed by applying well-known recombination techniques of the RAID erasure code against the surviving stripes to reconstruct the whole of the data stripe.

The present disclosure provides an improved method for performing strip placements within a storage system.

SUMMARY OF THE INVENTION

In accordance with a preferred embodiment of the present disclosure, a storage unit controller is utilized to identify a set of active failure domains associated with a set of storage units. Each of the active failure domains includes at least one component that is associated with at least one storage unit. A hierarchy of failure domains formed by multiple levels of identified active failure domains is defined. A group of the active failure domains is selected from the hierarchy of failure domains that is suitable for placing a stripe. Multiple strips of the stripe are then placed across the selected group of active failure domains.

All features and advantages of the present disclosure will become apparent in the following detailed written description.

BRIEF DESCRIPTION OF THE DRAWINGS

The disclosure itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
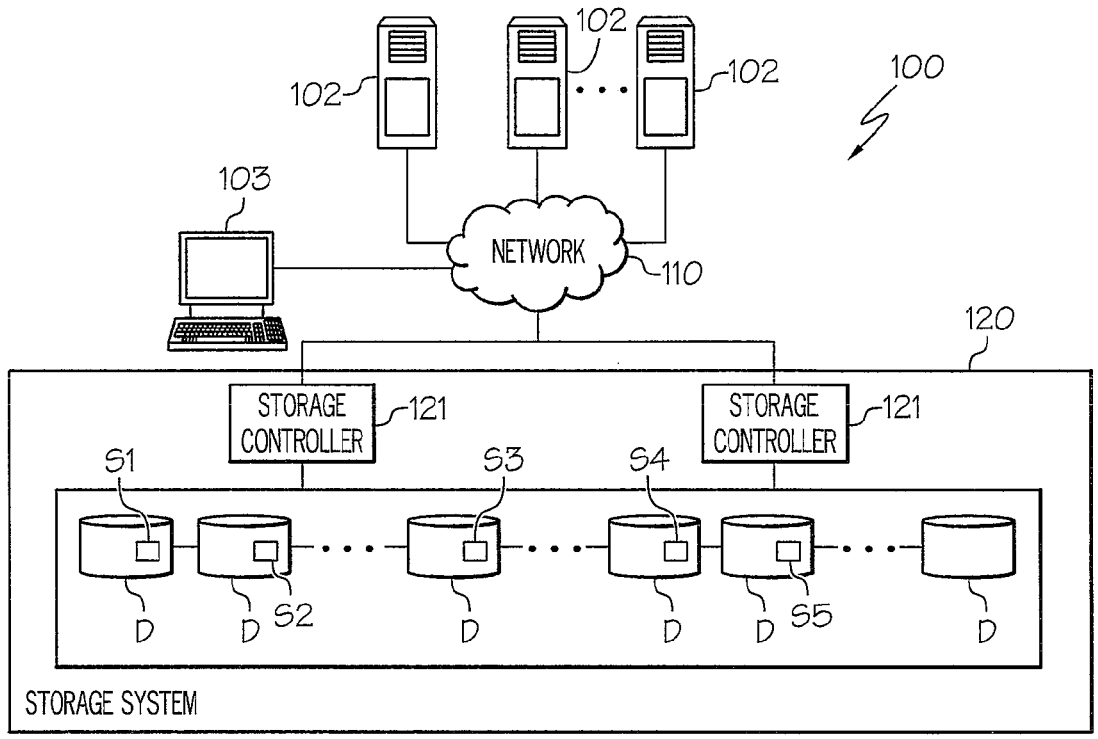
FIG. 1 is a block diagram of a data center having a storage system in which a preferred embodiment of the present invention can be implemented.

Referring now to the drawings and in particular to FIG. 1, there is depicted a block diagram of a data center having a storage system, in which a preferred embodiment of the present invention can be implemented. As shown, a data center 100 includes a storage system 120, multiple hosts 102 and a terminal 103. Storage system 120, hosts 102 and terminal 103 are interconnected via a wired or wireless network 110 such as a local-area network (LAN), a wide-area network (WAN), etc.

Storage system 120 is preferably a redundant array of independent disks (RAID) storage system that includes a group of hardware devices to ensure data redundancy. As shown, storage system 120 includes storage controllers 121 and multiple drives D for storing data therein, where a drive may be any storage unit including but not limited to disk drives, solid state drives such as flash memory, optical drives, tape drives and combinations thereof. Individual strips, such as strips s1-s5, constituting the whole of a data stripe can be spread across different drives D. Multiple drives D may be located within a drive drawer, and multiple drive drawers can be contained within a storage enclosure. Each of hosts 102 is a computer that accesses storage system 110 for the reading and writing of data. Each of hosts 102 can be, for example, a personal computer or server operated by a user who uses data center 100. As used herein, the term RAID includes redundant arrays of independent drives.

Terminal 102 is a computer that can be used by an administrator to input various instructions to storage controllers 121 and to receive various notices from storage controllers 121. Terminal 102 can be, for example, a notebook computer, a desktop computer, etc.

Figure 2:
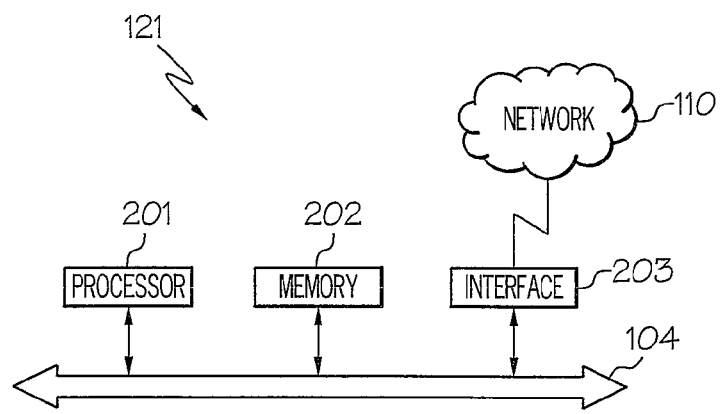
FIG. 2 is a block diagram of a storage controller within the storage system from FIG. 1.

With reference now to FIG. 2, there is depicted a block diagram of storage controller 121. As shown, storage controller 121 includes a processor 201, a memory 202 and an interface module 203, interconnected to each other via a bus 104. Processor 201 supervises overall control over storage controller 121. Memory 202 may include a read-only memory (ROM), a random-access memory (RAM) and a flash memory. For example, the flash memory stores firmware; the ROM stores application programs; and the RAM serves as a work area for processor 201. Interface module 203 is connected to network 110 and serves as an interface between network 110 and storage controller 121, and controls the input and output of data with respect to another computer.

The present invention re-defines the unit of consideration for strip placement to be a failure domain. A failure domain is defined as a hierarchical grouping of storage units that fail together because they share at least one common component. In other words, the present invention treats storage units as a hierarchy of failure domains, wherein at the lowest level may be a single drive while at higher levels may be a drive drawer or storage enclosure. This is because when comes to drive failures in a RAID storage system, such as storage system 120 from FIG. 1, drive drives within the RAID storage system are not always independent from each other, and in fact, they quite often share components, such as drive drawers, with other drives.

Figure 3:
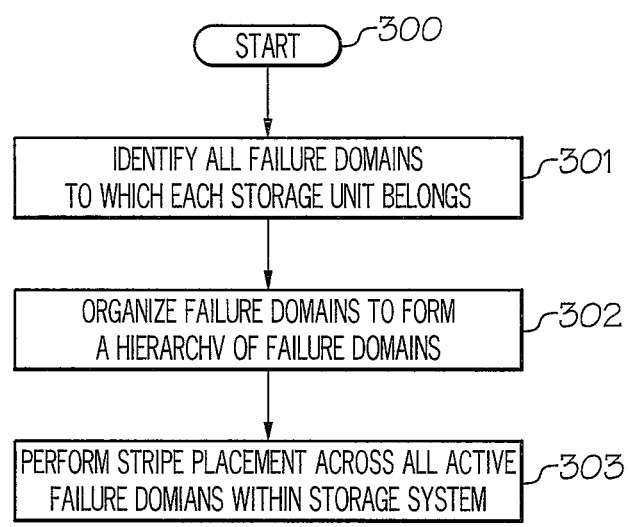
FIG. 3 is a high-level logic flow diagram of a method for performing stripe placement within the storage system from FIG. 1, in accordance with a preferred embodiment of the present invention.

Referring now to FIG. 3, there is depicted a high-level logic flow diagram of a method for performing stripe placement within a storage system, such as storage system 120 from FIG. 1, in accordance with a preferred embodiment of the present invention. Starting at block 300, all failure domains to which each storage unit respectively belongs are identified, as shown in block 301. Preferably, a SCSI Enclosure Services (SES) programmatic API can be utilized to determine the relationship of all storage units to their commonly shared components in each failure domain. However, the same information can be derived via other controller services or provided directly by an administrator via descriptive information of the shared components in some human readable form, as they are understood by those skilled in the art. This information is utilized to build a set of failure domain locations for every storage unit within the storage system. The failure domain locations include the identity of each potential failing component that is shared by or associated with one or more storage units at various levels of a failure domain hierarchy. For example, a failure domain location can be depicted in human readable form as:

```
level=0 identity=naa.5000C500337C816B
level=1 identity=6
level=2 identity=YG50CG19PJRW
```

The above example shows that a storage unit with WWN of naa.5000C500337C816B appears at level 0 (i.e., the lowest level) of a failure domain hierarchy. At level 1, the storage unit appears in storage unit drawer 6, and at level 2, the storage unit drawer appears in storage enclosure YG50CG19JRW. By determining the failure domain location of each storage unit in the storage system, all potential common failure points can be determined by utilizing commonality at different levels of the failure domain hierarchy. For example, a different failure domain location can be:

```
level=0 identity=naa.4000C400337C7999
level=1 identity=6
level=2 identity=YG50CG19PJRW
```

When comparing the two failure domain locations, there is commonalty at both level 1 and level 2 between two storage units, so they are both sibling storage units within the same storage unit drawer of the same storage enclosure. They are part of common failure domains at level 1 and at level 2.

Next, the failure domains are organized to form a hierarchy of failure domains, as depicted in block 302. The failure domains can be organized in a tree structure with the leaves of the tree structure being storage units, and the root of the tree structure being the highest failure domain component in the failure domain hierarchy. The failure domain hierarchy may span multiple storage systems coupled by a SAN or other network.

Figure 4:
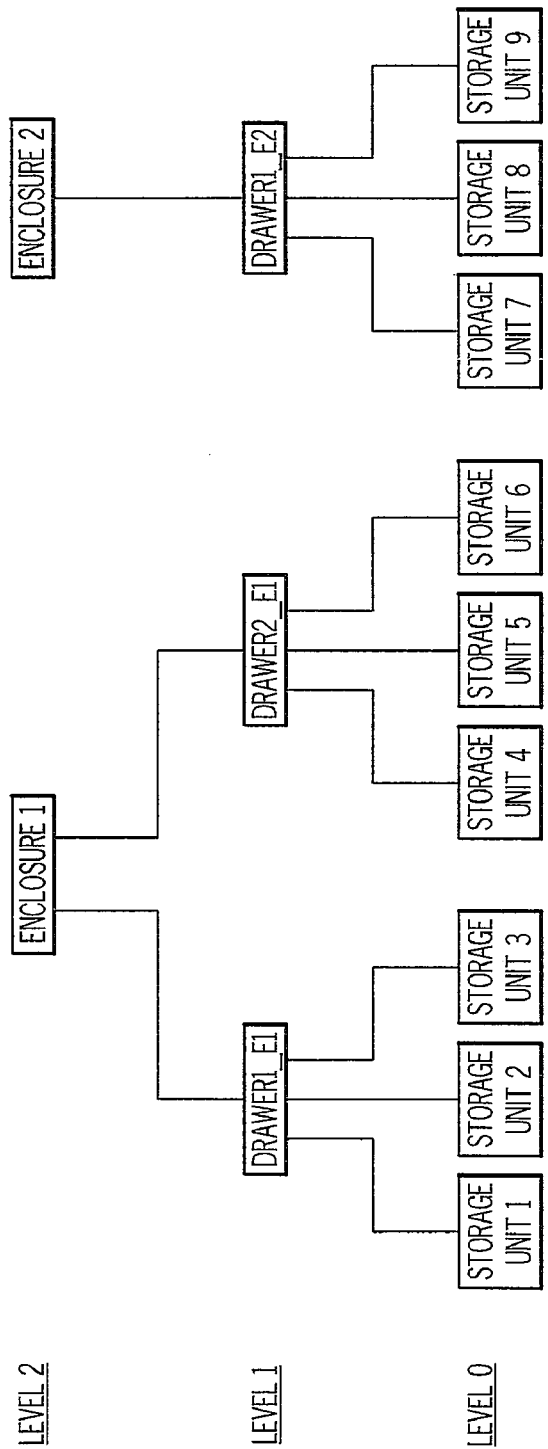
FIG. 4 depicts a hierarchy of failure domains within the storage system from FIG. 1.
Figure 5A:
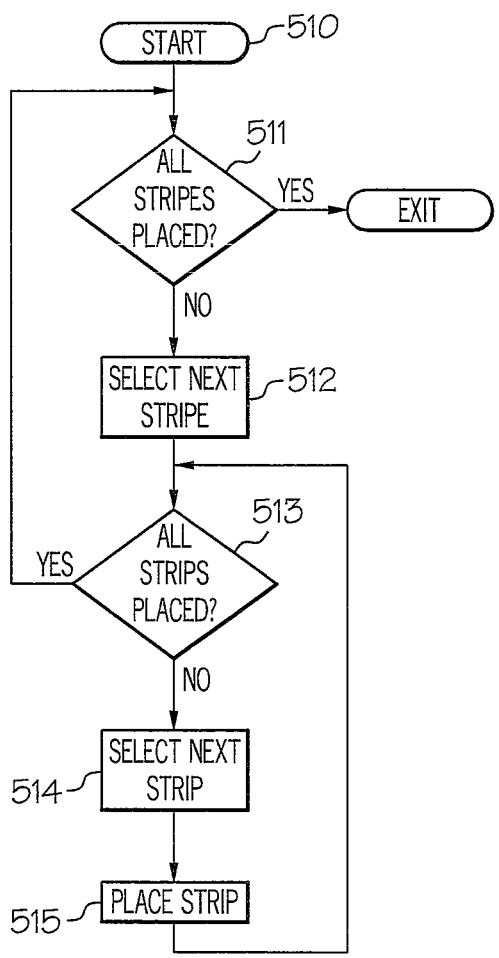
FIGS. 5A-5E are high-level logic flow diagrams of a method for performing strip placement within the storage system from FIG. 1, in accordance with a preferred embodiment of the present invention.
Figure 5B:
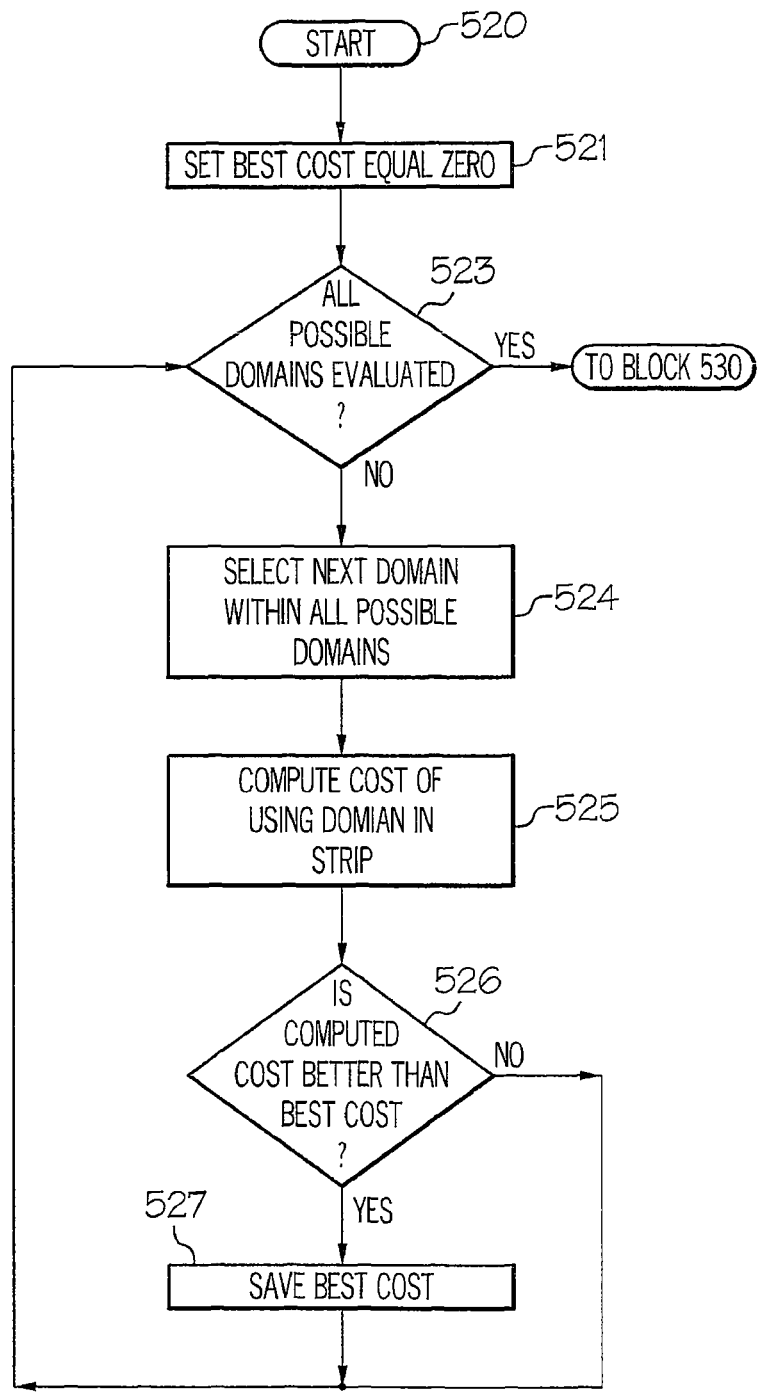
Figure 5C:
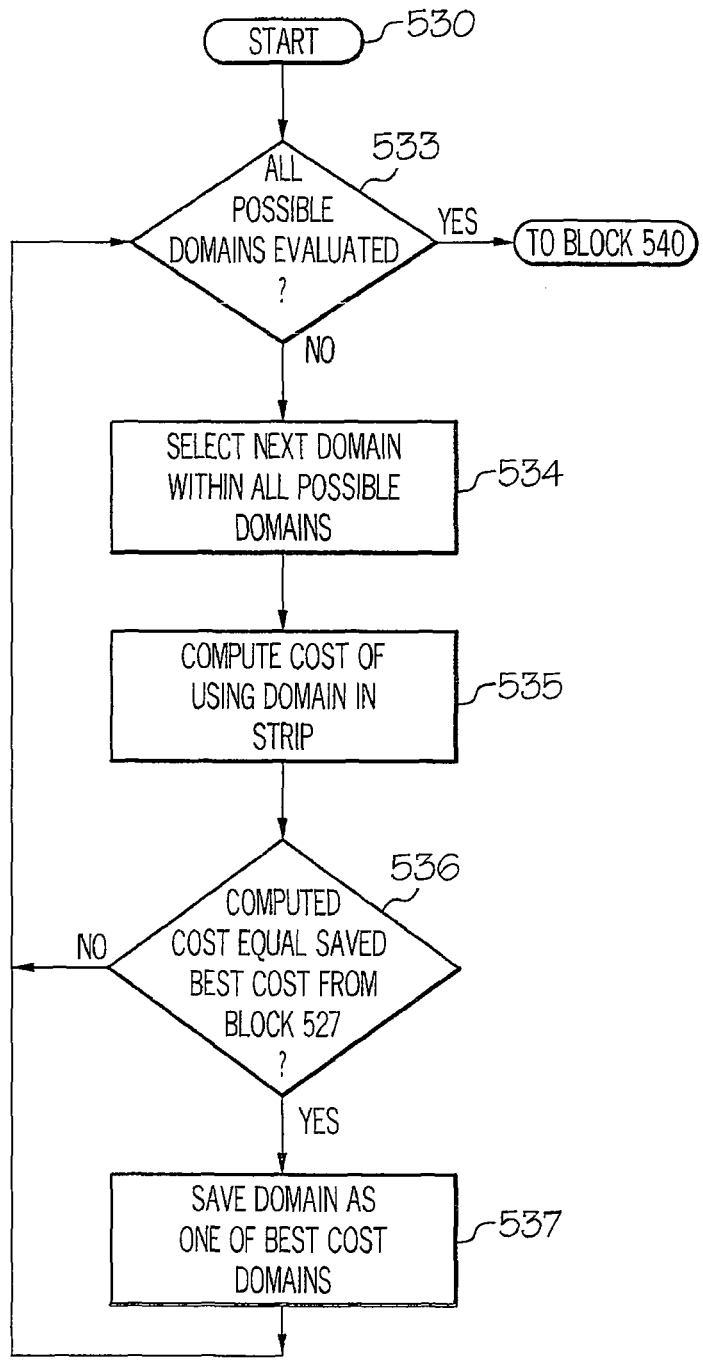
Figure 5D:
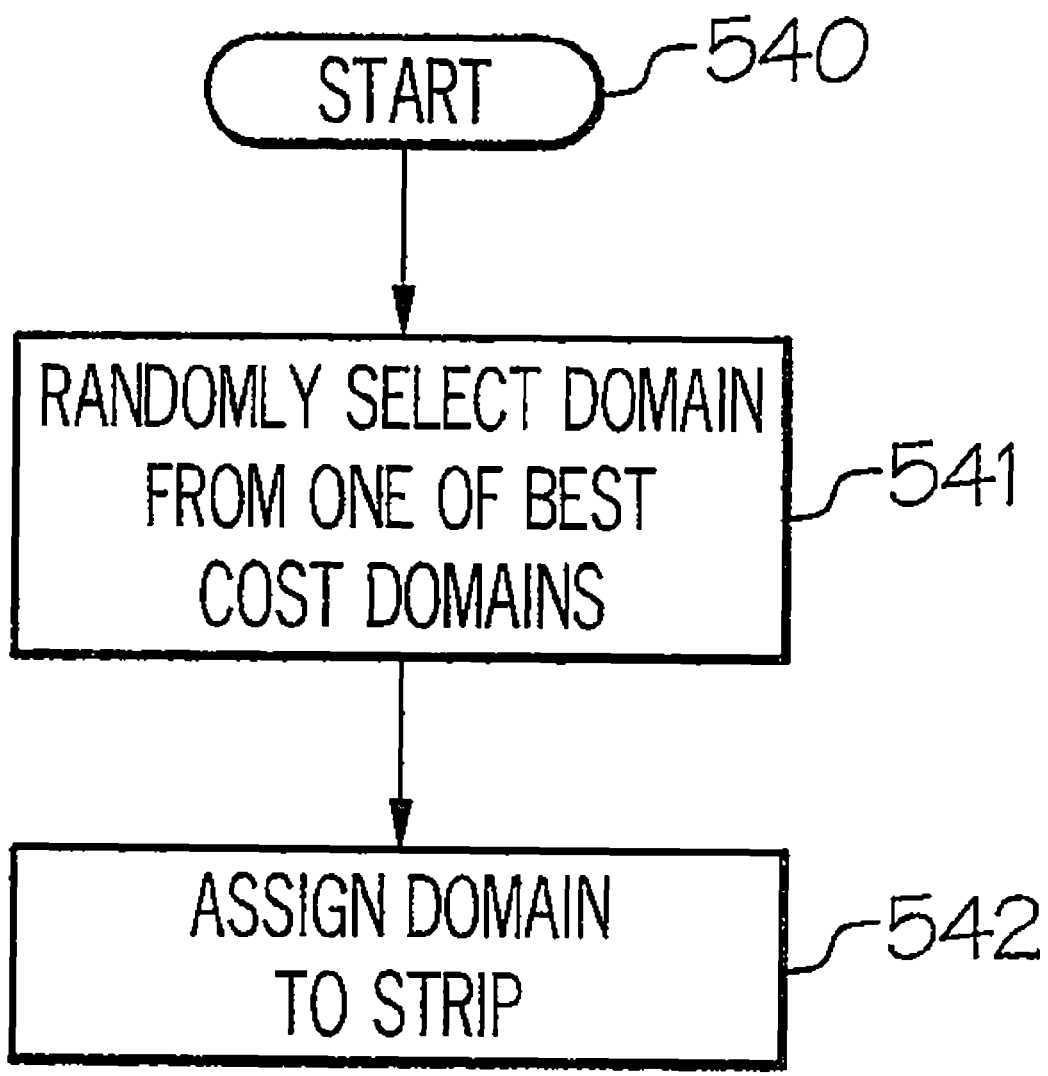
Figure 5E:
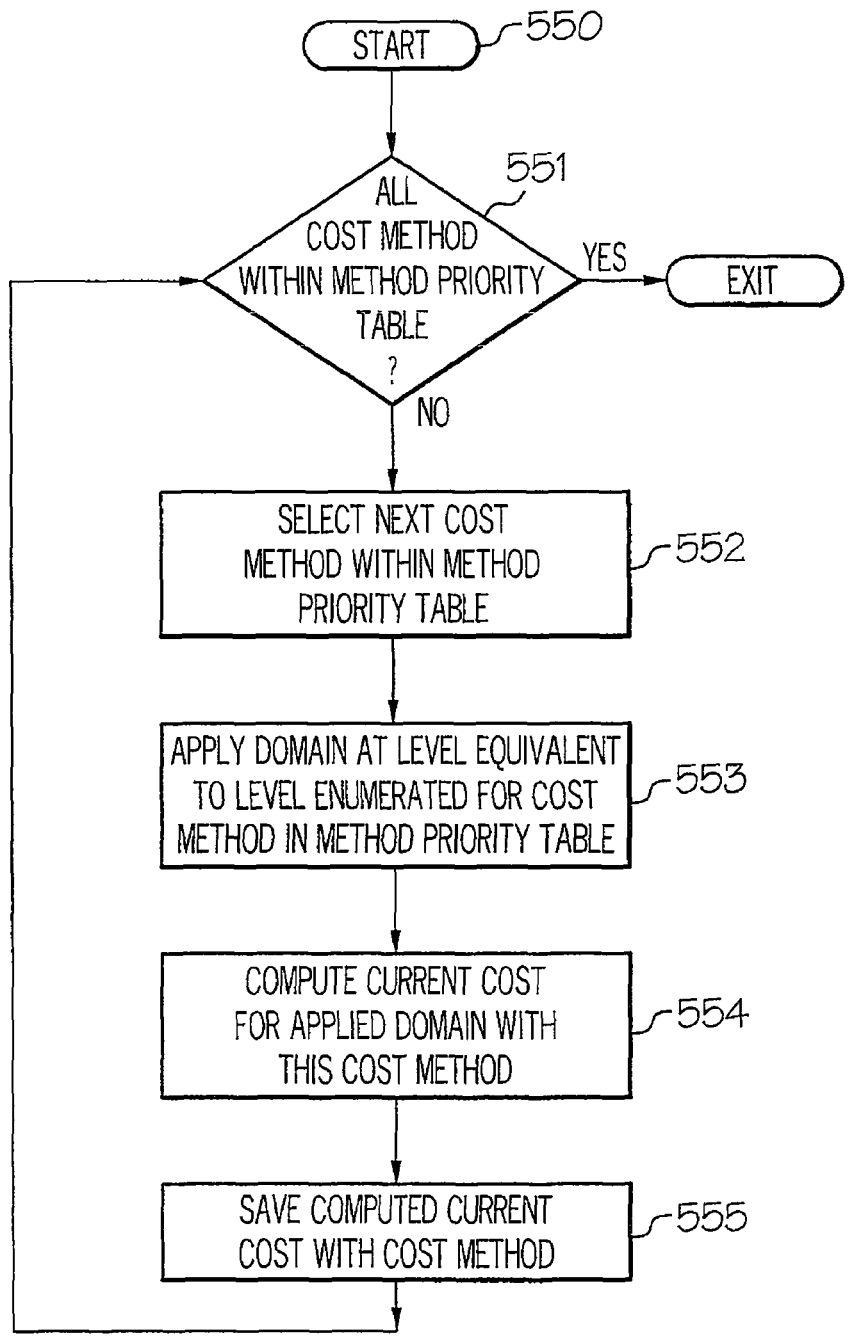

For example, as shown in FIG. 4, there is depicted a failure domain hierarchy. As shown, storage unit 1, storage unit 2 and storage unit 3 share a mutual failure domain component at level 1 in drawer1_e1, while storage unit 4, storage unit 5 and storage unit 6 share a mutual failure domain component at level 1 in drawer2_e1. Drawer1_e1 and drawer2_e1 share a mutual failure domain component at level 2 in enclosure1. In addition, storage unit 7, storage unit 8 and storage unit 9 belongs to a separate failure domain hierarchy, and they share no failure domain intersection with storage unit 1, storage unit 2, storage unit 3, storage unit 4, storage unit 5 and storage unit 6.

Finally, stripe placement is then performed across all of the active failure domains within the storage system, as depicted in block 303. This is considered the "initial" phase of stripe placement and serves as the baseline hardened layout that will be used during data recovery after a first failure. Stripe placement is preferably performed by using a greedy algorithm according to a set of cost methods. For the present disclosure, "greedy" means that the greedy algorithm only makes the "next best choice" among a set of possible choices to which a data strip is placed; and "cost method" means that each selection choice has a "cost" with regard to its quality of placement. Each "cost" is computed in turn for the order in which the cost methods are placed in a table that the greedy algorithm utilizes. The order of the cost methods are dimensional since a cost such as "balancing available space" may be computed at levels 1 to N of a failure domain hierarchy.

There are many potential cost methods that can be utilized by the greedy algorithm, and the following are some effective examples:

Disk State—computes a better or worse cost value dependent on the state of the storage unit that is being considered for potential strip placement. For example, storage units that are currently draining because of administrative action will have a higher cost than storage units that are in normal use.

Pairwise/Triwise Combinations—computes a better or worse cost value dependent on whether the failure domain in combination with other failure domains already selected in the strip would result in more stripes with this pairwise/triwise combination than the average number of stripes with any other pairwise/triwise combination of disks. In other words, for any pair of failure domains in the system that fail, there will be some number of data stripes that have a pair of strip failures. On balance, there should be no pair of domain failures that should affect more data stripes than any other combination of domain pairs. Pairwise and triwise combinations should be on average the same across the population of domains.

Available Space—computes a better or worse cost value dependent on whether the failure domain has greater or less average space to any other failure domain at the same level. Used to balance allocation across domains such that each failure domain has a roughly equivalent available space percentage.

No Reuse—computes a good or bad cost value dependent on whether the failure domain has already been used as a strip in the stripe that is currently being planned.

Low Reuse—computes a better or worse cost value dependent on the number of times the failure domain has already been used as a strip in the stripe that is currently being planned.

A MethodPriority structure is utilized by the greedy algorithm to perform the ordering of cost methods at different levels of a failure domain hierarchy. An example of a MethodPriority structure is shown as follows:

```
typedef struct MethodPriority
{
        FDLevel mpLevel; /* failure domain level of hierarchy */
        MethodType mpType; /* cost method type */
} MethodPriority;
```

The MethodPriority structure describes a level within a failure domain hierarchy and a cost method to be applied at that level. The MethodPriority structure is used in an array of cost methods (i.e., cost methods 0 to N) that must be applied in sequence by the greedy algorithm.

A MethodPriority table describes what cost methods will be applied at every level of a failure domain hierarchy for a storage system in which new stripes are to be placed. An example of a MethodPriority table is as follows:

```
static MethodPriority NewPGPlanMethods[ ] =
{
{ 0, MethodNoDrain },        /* 0 - Target no draining domains */
{ 0, MethodNoReuse },        /* 0 - Target no domain reuse in group */
{ 0, MethodAnyAvailParts },  /* 0 - Target domains with avail parts */
{ 3, MethodLowReuse },       /* 3 - Target low domain reuse in group */
{ 2, MethodLowReuse },       /* 2 - Target low domain reuse in group */
{ 1, MethodLowReuse },       /* 1 - Target low domain reuse in group */
{ 3, MethodHighAvailParts }, /* 3 - Target higher avail part domains*/
{ 2, MethodHighAvailParts }, /* 2 - Target higher avail part domains*/
{ 1, MethodHighAvailParts }, /* 1 - Target higher avail part domains*/
{ 0, MethodHighAvailParts }, /* 0 - Target higher avail part domains*/
{ 0, MethodLowDouble },      /* 0 - Target low double failure combos */
{ 0, MethodLowTriple }       /* 0 - Target low triple failure combos */
```

When deciding where a next strip should be placed, the greedy algorithm utilizes the MethodPriority table to drive its considerations at every level of a failure domain hierarchy.

The following is a description of the NewPGPlanMethods[ ] MethodPriority table:

At index 0, the MethodNoDrain cost method computes a "good cost" for the potential strip placement if the failure domain being considered at level 0 is not in the draining state. However, if the physical disk being considered for potential strip placement is in the draining state, then a "worse cost" is computed.

At index 1, the MethodNoReuse cost method computes a "good cost" for using the potential failure domain at level 0 if the physical disk is not already present as a sibling strip in the portion of the strip already planned. When moving up in the table (NewPGPlanMethods[ ] higher array indexes), levels of the failure domain hierarchy coming into play above level 0 can be seen. For example:

```
{ 3, MethodLowReuse },  /* 3 - Target low domain reuse in group */
{ 2, MethodLowReuse },  /* 2 - Target low domain reuse in group */
{ 1, MethodLowReuse },  /* 1 - Target low domain reuse in group */
```

The greedy algorithm takes these three elements of the NewPGPlanMethods[ ] table in turn to compute a "low reuse" cost for domains at failure domain hierarchy level 3 (e.g., a node where storage enclosure is attached), then at hierarchy level 2 (e.g., a storage enclosure), and then at hierarchy level 1 (e.g., a disk drawer).

After the NewPGPlanMethods[ ] table and an internal code structure describing a discovered failure domain hierarchy have been obtained, the greedy algorithm can be executed. The greedy algorithm begins with a strip that needs to be planned and a code width required for the strip.

Referring now to FIGS. 5A-5E, there are depicted high-level logic flow diagrams of a method (greedy algorithm) for performing strip placement within a storage system, such as storage system 101 from FIG. 1, in accordance with a preferred embodiment of the present invention. When placing each strip X of a whole data stripe having a code width Y, this method will be executed Y times in an iterative manner for each strip X that needs to be placed. Starting at block 500, a determination is made whether or not all stripes have been placed, as depicted in block 511. If yes, the process exits; otherwise, a next stripe is selected for placement, as shown in block 512. A determination is made whether or not all strips within the selected stripe have been placed, as shown in block 513. If yes, the process returns to block 511; otherwise, a next strip of the stripe is selected for placement, as depicted in block 514. After the strip is placed, as shown in block 515, the process returns to block 513.

Before a strip is placed (in block 515), the best costs for all possible failure domains that the strip can potentially be placed need to be computed. Starting at block 520, the best cost is set equal to zero, as shown in block 521, and the domain is set equal to a first failure domain with all possible failure domains, as depicted in block 522. A determination is made whether all possible failure domains have been evaluated, as shown in block 523. If yes, the process proceeds to block 530. Otherwise, the next failure domain within all possible failure domains is selected, as depicted in block 524. The cost of using failure domain in strip is computed, as shown in block 525. A determination is made whether or not the computed cost is better than the best cost, as depicted in block 526. If no, the process returns to block 523. Otherwise, the best cost is saved, as shown in block 527, and the process then returns to block 523.

After the best costs for all possible failure domains have been computed, the possible failure domains are evaluated again to locate the failure domains that match the previously saved best cost. Starting at block 530, the domain is set equal to a first failure domain with all possible failure domains, as shown in block 531. A determination is made whether all possible failure domains have been evaluated, as shown in block 533. If yes, the process proceeds to block 540. Otherwise, the next failure domain within all possible failure domains is selected, as depicted in block 534. The cost of using failure domain in strip is computed, as shown in block 535. A determination is made whether or not the computed cost equal the best cost previously saved in block 527, as depicted in block 536. If no, the process returns to block 533. Otherwise, the failure domain is saved as one of the best cost failure domains, as shown in block 537, and the process then returns to block 533.

After all the possible failure domains have been reduced to a smaller set of best cost failure domains, one of the best cost failure domains can be selected for strip placement. Starting at block 540, one of the best cost failure domains saved in block 537 is randomly selected, as shown in block 541, and this selected failure domain is then assigned for strip placement in block 515, as depicted in block 542.

The details for computing the cost of using a failure domain in strip in block 525 can be further described as follows. Starting at block 550, a determination is made whether or not all cost method in the MethodPriority table have been employed, as shown in block 551. If yes, the process exits; otherwise, a next cost method is selected from the MethodPriority table, as depicted in block 552. A failure domain at level equivalent to the level enumerated for the cost method in the MethodPriority table is applied, as shown in block 553. The current cost for the applied failure domain is computed using the current cost method, as depicted in block 554. The computed current cost is then saved with the current cost method, as shown in block 555.

Consider the following cost method from MethodPriority table:
  {1, MethodLowReuse}, /*1—Target low domain reuse in group*/
When applying the failure domain relative to the cost method level in MethodPriority table, a cost at level 1 needs to be computed, which is the next failure domain group above level 0. In other words, a "low reuse" cost method for the "disk drawer" failure domain level needs to be computed. Furthermore, the cost method computation must be given the failure domain for the parent disk drawer of the physical disk being iterated on.

The cost method MethodLowReuse considers all disk drawers that have been already selected in the strip (other stripes already planned for which there are none in the first iteration) and it computes a "best cost" if this disk drawer has never been used before in this strip. The cost method MethodLowReuse computes a "worse cost" if this disk drawer has been used in prior stripes of the whole data strip (secondary and subsequent iterations of strip planning).

The result of the iteration is that the best cost that goes deepest into the priority of cost methods described by MethodPriority table instances such as NewPGPlanMethods[ ] is obtained.

For a code width of 4 (e.g., a 4-way mirrored strip), the greedy algorithm will be executed four times for each strip that needs to be planned. Each iteration may have to consider prior strip selections within the strip if it is calling methods such as MethodLowReuse. Fundamentally, the greedy algorithm is trying to find the best cost that goes deepest into the cost method table. What ultimately happens is not a random fluctuation of "best" failure domains but a convergence of best costs that goes deeper and deeper into the cost method table with subsequent iterations. As a result, an excellent layout for strip placements across failure domains is produced.

When subsequent failures occur, one or more failure domains may become inactive and some strips of stripes may be missing. These missing strips need to be rebuilt and placed across failure domains that remain active by using the greedy algorithm. This is considered the "rebuild" phase of stripe placement, and only those strips that have failed are targeted.

When the storage system grows or shrinks, there is a need to relocate some of the strips, and this is considered the "re-balance" phase of stripe placement. In order to determine what strips should be moved, a non-hardened pristine layout of the stripes is initially generated for comparison to the existing hardened layout. During pristine layout planning, a set of best costs are computed for each placement. The poorest selection performed during pristine placement is considered the "worst best" cost. In other words, among all the selections, at least one or more had a best cost that was less than best cost of all other stripe selections. Once this "worst best" cost is known, it can be utilized as a baseline comparison for the current hardened layout. Each existing hardened strip is taken and its cost is computed. If the computed cost is less than the "worst best," then the stripe must be re-planned using the greedy algorithm.

As has been described, the present disclosure provides an improved method for preforming stripe placements in a storage system.

One technique that benefits from the present invention is declustered RAID, which randomly and uniformly distributes the data, redundancy, and spare space across the storage devices. The present invention improves the performance of applications using the storage system during the reconstruction of data after a failure and can also improve the data reliability. Reliability is further enhanced by the present invention which, during data, redundancy, and spare space placement on the storage devices, can take into account the failure domain characteristics of the underlying storage hardware and subsystems.

It is also important to note that although the present invention has been described in the context of a fully functional computer system, those skilled in the art will appreciate that the mechanisms of the present invention are capable of being distributed as a program product in a variety of recordable type media such as compact discs and digital video discs.

The present invention may be a system, a method, and/or a computer program product. The computer program product may include a computer readable storage medium (or media) having computer readable program instructions thereon for causing a processor to carry out aspects of the present invention. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the present invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the disclosure has been particularly shown and described with reference to a preferred embodiment, it will be understood by those skilled in the art that various changes in form and detail may be made therein without departing from the spirit and scope of the disclosure.

What is claimed is:

1. A computer implemented method of determining a data storage layout comprising:

identifying by a controller a plurality of active failure domains associated with a plurality of storage units, wherein each of said plurality of active failure domains includes at least one component that is associated with at least one storage unit;

defining a hierarchy of failure domains formed by a plurality of levels of identified active failure domains;

selecting a group of said active failure domains from said hierarchy of failure domains that is suitable for placing a stripe, wherein said selecting further includes selecting one of said active failure domains based on a cost determination of a strip placement by computing a cost value dependent on whether or not said one active failure domain in combination with other active failure domains already selected in said stripe will lead to more data stripes than the average number of any other combination of domain pairs; and placing a plurality of strips of said stripe across said selected group of active failure domains.

2. The method of claim 1 further comprising changing placement of a stripe among said hierarchy of failure domains after a failure domain has been removed from said hierarchy of failure domains.

3. The method of claim 1 further comprising changing placement of a stripe among said hierarchy of failure domains after a new failure domain has been added to said hierarchy of failure domains.

4. A computer non-transitory machine-readable medium having a computer program product for determining a data storage layout, said computer non-transitory machine-readable medium comprising:

program code for identifying a plurality of active failure domains associated with a plurality of storage units, wherein each of said plurality of active failure domains includes at least one component that is associated with at least one storage unit;

program code for defining a hierarchy of failure domains formed by a plurality of levels of identified active failure domains;

program code for selecting a group of said active failure domains from said hierarchy of failure domains that is suitable for placing a stripe, wherein said selecting further includes selecting one of said active failure domains based on a cost determination of a strip placement by computing a cost value dependent on whether or not said one active failure domain in combination with other active failure domains already selected in said stripe will lead to more data stripes than the average number of any other combination of domain pairs; and program code for placing a plurality of strips of said stripe across said selected group of active failure domains.

5. The machine-readable medium of claim 4 further comprising program code for changing placement of a stripe among said hierarchy of failure domains after a failure domain has been removed from said hierarchy of failure domains.

6. The machine-readable medium of claim 4 further comprising program code for changing placement of a stripe among said hierarchy of failure domains after a new failure domain has been added to said hierarchy of failure domains.

* * * * *